(12) United States Patent
Sakamoto et al.

(10) Patent No.: US 9,748,542 B2
(45) Date of Patent: Aug. 29, 2017

(54) COMPOSITE POROUS FILM HAVING EXCELLENT HEAT RESISTANCE

(71) Applicants: JNC CORPORATION, Tokyo (JP); JNC PETROCHEMICAL CORPORATION, Tokyo (JP)

(72) Inventors: Kazuyuki Sakamoto, Chiba (JP); Nobuo Enoki, Chiba (JP); Yoshiyuki Oogi, Chiba (JP); Shingo Itou, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

(21) Appl. No.: 14/422,000

(22) PCT Filed: Jul. 30, 2013

(86) PCT No.: PCT/JP2013/070592
§ 371 (c)(1),
(2) Date: Feb. 17, 2015

(87) PCT Pub. No.: WO2014/030507
PCT Pub. Date: Feb. 27, 2014

(65) Prior Publication Data
US 2015/0221917 A1    Aug. 6, 2015

(30) Foreign Application Priority Data
Aug. 23, 2012    (JP) .................................. 2012-183822

(51) Int. Cl.
*H01M 2/16* (2006.01)
*B32B 27/20* (2006.01)
(Continued)

(52) U.S. Cl.
CPC ............. *H01M 2/162* (2013.01); *B32B 27/20* (2013.01); *B32B 27/205* (2013.01); *B32B 27/32* (2013.01);
(Continued)

(58) Field of Classification Search
CPC .......................... H01M 2/1666; H01M 2/1686
See application file for complete search history.

(56) References Cited

U.S. PATENT DOCUMENTS

| | | | |
|---|---|---|---|
| 6,746,803 B1 | 6/2004 | Bauer et al. | |
| 2001/0005560 A1* | 6/2001 | Yoshida | H01M 2/145 429/144 |

(Continued)

FOREIGN PATENT DOCUMENTS

| | | |
|---|---|---|
| CN | 101600571 | 12/2009 |
| CN | 102349177 | 2/2012 |

(Continued)

OTHER PUBLICATIONS

1st Office Action of China Counterpart Application, issued on Nov. 27, 2015, p. 1-p. 8, in which the listed references were cited.
(Continued)

*Primary Examiner* — Olatunji Godo
(74) *Attorney, Agent, or Firm* — Jianq Chyun IP Office

(57) ABSTRACT

To provide a composite porous film in which thermal shrinkage is satisfactorily suppressed even when temperature exceeds a melting temperature of a polyolefin resin, adhesion between a microporous membrane and a heat-resistant layer is improved, and dropout of an inorganic filler is suppressed. The composite porous film is composed of the heat-resistant layer formed of the inorganic filler and a binder, and the microporous membrane formed of the poly-
(Continued)

olefin resin, and the composite porous film having a primary particle size of the inorganic filler in the range of 5 nanometers to 100 nanometers.

5 Claims, 2 Drawing Sheets

(51) Int. Cl.
  *B32B 27/32* (2006.01)
  *H01M 10/0525* (2010.01)
  *C08J 7/04* (2006.01)
(52) U.S. Cl.
  CPC ............ *C08J 7/042* (2013.01); *C08J 7/047* (2013.01); *H01M 2/166* (2013.01); *H01M 10/0525* (2013.01); *B32B 2255/10* (2013.01); *B32B 2255/20* (2013.01); *B32B 2305/026* (2013.01); *B32B 2307/516* (2013.01); *B32B 2307/518* (2013.01); *C08J 2323/04* (2013.01); *C08J 2323/10* (2013.01); *C08J 2323/12* (2013.01); *C08J 2400/22* (2013.01); *C08J 2427/16* (2013.01)

(56) References Cited

U.S. PATENT DOCUMENTS

| | | | |
|---|---|---|---|
| 2007/0020525 A1* | 1/2007 | Kim | H01M 2/145 429/251 |
| 2008/0070107 A1 | 3/2008 | Kasamatsu et al. | |
| 2009/0274954 A1 | 11/2009 | Sato et al. | |
| 2010/0068612 A1* | 3/2010 | Nishikawa | H01M 2/145 429/129 |
| 2010/0112432 A1 | 5/2010 | Nishida et al. | |
| 2012/0015229 A1 | 1/2012 | Ohashi et al. | |
| 2012/0115036 A1 | 5/2012 | Lee et al. | |
| 2014/0302389 A1 | 10/2014 | Hasegawa et al. | |

FOREIGN PATENT DOCUMENTS

| | | |
|---|---|---|
| CN | 103946023 | 7/2014 |
| EP | 2408043 | 1/2012 |
| EP | 2463331 | 6/2012 |
| JP | 2002-541644 | 12/2002 |
| JP | 2004-227972 | 8/2004 |
| JP | 2008-123996 | 5/2008 |
| JP | 2010-067359 | 3/2010 |
| JP | 2010-123465 | 6/2010 |
| JP | 2011032445 | 2/2011 |
| JP | 2011-110704 | 6/2011 |
| JP | 2011-154936 | 8/2011 |
| JP | 2011-258462 | 12/2011 |
| JP | 2012-003938 | 1/2012 |
| WO | 2006/123798 | 11/2006 |
| WO | 2008/123331 | 10/2008 |
| WO | 2010/104077 | 9/2010 |
| WO | 2012/018133 | 2/2012 |
| WO | 2013/073362 | 5/2013 |

OTHER PUBLICATIONS

"Office Action of Japan Counterpart Application", issued on Feb. 12, 2015, with English translation thereof, p. 1-p. 2, in which the listed reference was cited.
"International Preliminary Report on Patentability of PCT application"; this report contains the following items :Form PCT/IB/338, PCT/IB/373, PCT/ISA237(cover sheet), PCT/ISA237(Box No. I),PCT/ISA237(Box No. V), PCT/ISA237(Box No. VI), mailed on Feb. 24, 2015, which is English translation of "Written Opinion of the International Searching Authority", p. 1-p. 13.
"International Search Report (Form PCT/ISA/210)", mailed on Oct. 22, 2013, with English translation thereof, pp. 1-5, in which ten of the listed references (JP2011-154936, JP2012-003938, WO2006/123798, JP2004-227972, WO2012/018133, WO2008/123331, WO2013/073362, JP2002-541644, JP2011-258462 and WO2010/104077) were cited.
Office Action of Taiwan Counterpart Application, with English translation, issued on Aug. 16, 2016, pp. 1-8.
Office Action of Korea Counterpart Application with English translation, issued on May 27, 2016, p. 1-p. 10, in which the listed reference was cited.
Park et al., "Close-packed SiO2/poly(methyl methacrylate) binary nanoparticles-coated polyethylene separators for lithium-ion batteries," Journal of Power Sources, Dec. 2010, pp. 8306-8310.
Search Report of Europe Counterpart Application, issued on Apr. 28, 2016, p. 1-p. 10, in which the listed references were cited.

* cited by examiner

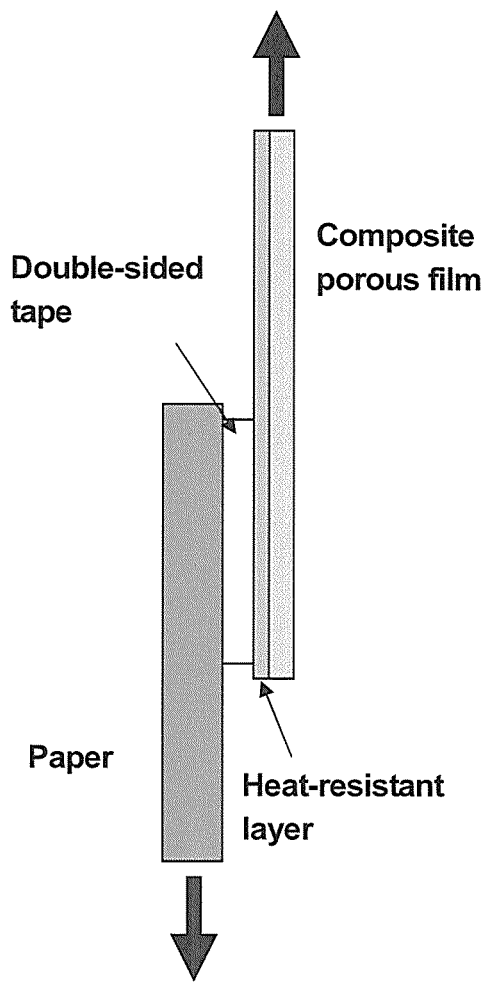

COMPOSITE POROUS FILM HAVING EXCELLENT HEAT RESISTANCE

CROSS-REFERENCE TO RELATED APPLICATION

This application is a 371 application of an international PCT application serial no. PCT/JP2013/070592, filed on Jul. 30, 2013, which claims the priority benefit of Japan Patent Application No. 2012-183822, filed on Aug. 23, 2012. The entirety of each of the above-mentioned patent applications is hereby incorporated by reference herein and made a part of this specification.

TECHNICAL FIELD

The present invention relates to a composite porous film. More specifically, the invention relates to a composite porous film having strength suitable for suppression of shrinkage under a high temperature atmosphere and excellent heat resistance.

BACKGROUND ART

A microporous membrane using a polymer material is widely used for a filter such as an air filter, a bag filter and a filter for liquid filtration, and a separator used for a secondary battery, a capacitor or the like. In general, the microporous membrane has higher strength in comparison with a raw material such as a woven fabric and a nonwoven fabric and is excellent in compactness, and therefore among applications described above, in particular, the microporous membrane is widely used as a microfiltration membrane and an ultrafiltration membrane, and a separator for a lithium-ion secondary battery. Above all, a microporous membrane formed of polyolefin-based resin is excellent in chemical resistance and oxidation resistance, and therefore used most frequently.

When the membrane is used for the lithium-ion secondary battery, in order to prevent a rapid temperature rise due to overcharge or a short circuit in connection with achieving high capacitance, safety is improved by using a microporous membrane having a shut-down function of clogging micropores by melting of a polymer at around 120° C., as in a polyethylene microporous membrane, to increase internal impedance and to inhibit progress of a battery reaction, having a function of preventing a short circuit without causing meltdown even at around 150° C., as in a polypropylene microporous membrane, or having both of the shut-down function and prevention of meltdown by laminating both thereof.

However, when temperature exceeds 160° C. being a melting temperature of polypropylene, prevention of the short circuit caused by meltdown is difficult, and if the short circuit is caused, rapid generation of heat occurs. When the temperature reaches 200° C. or higher, oxygen emitted by thermal decomposition of a cathode vigorously reacts with an organic solvent to cause bursting or ignition of a battery due to thermal runaway. Therefore, various attempts have been proposed so far so that the short circuit due to meltdown can be prevented even at the melting temperature of polypropylene or higher.

As an attempt for improving heat resistance of the microporous membrane, for example, a proposal has been made on a heat-resistant separator having a resin porous film with a thermal shrinkage at 150° C. of 10% or more, and a heat-resistant porous layer formed on a surface of the resin porous film and containing 70% by volume or more of heat-resistant particulates (see Patent literature No. 1, for example). Moreover, a proposal has also been made on a separator for a battery prepared by uniting porous film (A) containing at least an inorganic filler and porous film (B) being a mixture of a polyolefin having a melting point less than 150° C. and a polyolefin having a melting point of 150° C. or higher to adjust thermal shrinkage at 150° C. to be 5% or less (see Patent literature No. 2, for example).

In techniques described in Patent literature Nos. 1 and 2, the shut-down function is maintained, and further shutdown can be maintained even under conditions of a higher temperature. However, when the temperature exceeds 160° C. being the melting temperature of polypropylene, melting shrinkage of a polyolefin layer becomes strong, and therefore prevention of the short circuit between electrodes becomes difficult at around 180° C.

Therefore, a proposal has also been made on a heat-resistant separator prepared by providing, with a porous layer mainly containing an inorganic filler having a heat-resistant temperature of 150° C. or higher, a microporous membrane having a sticking strength of 3 N at largest as produced by a dry uniaxial stretching method according to which resistance to thermal shrinkage is relatively satisfactory among microporous membranes (see Patent literature No. 3, for example), and a proposal has also been made on a heat-resistant separator prepared by providing, with a porous layer mainly containing a needle-shaped filler having a heat-resistant temperature of 150° C. or higher, a microporous membrane produced by the dry uniaxial stretching method in an identical manner (see Patent literature No. 4, for example), or the like.

In techniques described in Patent literature Nos. 3 and 4, while the separators are excellent in shrinkage suppression under a high temperature, a degree of orientation of crystals of a polyolefin on a microporous membrane surface tends to become high due to characteristics of a production method by the stretching method. Therefore, concern exists about reduction of adhesion with the inorganic filler to cause dropout of the inorganic filler during a production step and use.

CITATION LIST

Patent Literature

Patent literature No. 1: JP 2008-123996 A.
Patent literature No. 2: JP 2010-123465 A.
Patent literature No. 3: JP 2011-154936 A.
Patent literature No. 4: JP 2012-003938 A.

SUMMARY OF INVENTION

Technical Problem

Thus, a problem of the invention is to provide a composite porous film in which thermal shrinkage is satisfactorily suppressed even when temperature exceeds a melting temperature of a polyolefin resin to improve adhesion between a microporous membrane and a heat-resistant layer and dropout of an inorganic filler is suppressed.

Solution to Problem

The invention has structure described below.
Item 1. A composite porous film composed of a heat-resistant layer formed of an inorganic filler and a binder, and a microporous membrane formed of a polyolefin resin, wherein a primary particle size of the inorganic filler is 5 nanometers to 100 nanometers.

Item 2. The composite porous film according to item 1, wherein the inorganic filler constituting the heat-resistant layer is at least one kind selected from the group consisting of alumina, boehmite, silica and titania.

Item 3. The composite porous film according to item 1 or 2, wherein the inorganic filler constituting the heat-resistant layer comprises an aggregate of a plurality of primary particles, and a mean particle size of the aggregate is 0.3 micrometer or less.

Item 4. The composite porous film according to any one of items 1 to 3, wherein the microporous membrane constituting the composite porous film is prepared by a dry uniaxial stretching method.

Item 5. The composite porous film according to any one of items 1 to 4, wherein the polyolefin resin constituting the microporous membrane is polypropylene.

Advantageous Effects of Invention

A composite porous film of the invention is formed of a heat-resistant layer including an inorganic filler having a primary particle size of 5 nanometers to 100 nanometers and a binder, and a microporous membrane including a polyolefin resin. Thus, thermal shrinkage can be satisfactorily suppressed even under conditions in which temperature rises to a melting temperature or higher to improve adhesion between the microporous membrane and the heat-resistant layer, and dropout of the inorganic filler can also be suppressed to contribute to improvement in productivity. In particular, when the composite porous film is used as a separator for a secondary battery, prevention of a short circuit between electrodes can be maintained.

BRIEF DESCRIPTION OF DRAWINGS

FIG. 4 shows a plot diagram showing measurement of tape adhesion.

DESCRIPTION OF EMBODIMENTS

Figure 1:
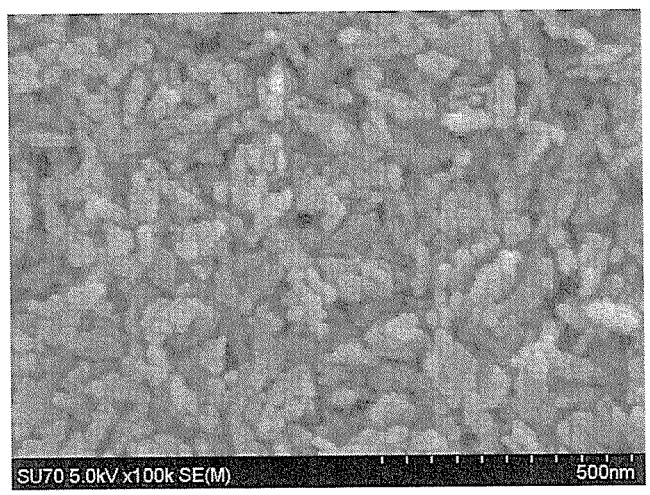
FIG. 1 shows an SEM photograph obtained by photographing a composite porous film having structure identical with the structure in Example 1 from a heat-resistant layer side.
Figure 2:
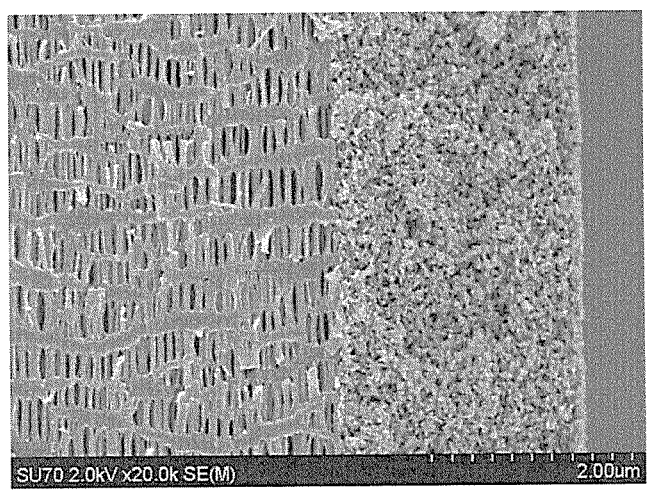
FIG. 2 shows an SEM photograph obtained by photographing a composite porous film having structure identical with the structure in Example 1 from an MD cross-section.

The invention concerns a composite porous film formed of a heat-resistant layer including an inorganic filler having a primary particle size of 5 nanometers to 100 nanometers and a binder, and a microporous membrane including a polyolefin resin.

The microporous membrane to be used in the invention is formed of a polyolefin resin. Specific examples include polyethylene and polypropylene. A copolymer thereof, a blend of two or more kinds of homopolymers or copolymers thereof may be optionally used. Moreover, the polyolefin resin such as polybutene-1, polyhexene-1, polyoctene-1, poly4-methylpentene-1, polymethylpentene, 1,2-polybutadiene and 1,4-polybutadiene can also be used. Any weight average molecular weight (Mw) and any molecular weight distribution (Mw/Mn) of the polyolefin resin may be applied if the microporous membrane can be produced.

The polypropylene resin to be used in the invention is a crystalline polymer mainly formed of a propylene polymerization unit, and preferably polypropylene having a propylene polymerization unit of 90% by weight or more of the total. Specifically, the polypropylene resin may be a homopolymer of propylene, or a random or block copolymer in an amount of 90% by weight or more of propylene polymerization unit and 10% by weight or less of ethylene or α-olefin. Specific examples of an olefin to be used when the crystalline polypropylene is the copolymer include ethylene, 1-butene, 1-pentene, 1-hexene, 1-octene, 1-decene, 1-dodecene, 4-methyl-1-pentene and 3-methyl-1-pentene. Use of a propylene homopolymer thereamong is preferred in view of production cost.

Specific examples of the polyethylene resin to be used in the invention include a homopolymer of ethylene and a binary or multinary random or block copolymer containing as a main component ethylene, and a monomer other than ethylene, and a mixture of two or more kinds thereof. In addition, the main component in the invention means a component contained in a most amount. The monomer other than ethylene as described above is not particularly limited, but specific examples include an olefin having 3 to 12 carbons, such as propylene, 1-butene, 1-pentene, 1-hexene and 1-octene, vinyl ester such as vinyl acetate, acrylic acid ester such as ethyl acrylate, methacrylic acid ester such as methyl methacrylate and carbon monoxide. The monomers may be used in one kind, or in combination of two or more kinds thereof.

Moreover, in the polyolefin resin such as the polypropylene resin and the polyethylene resin according to the invention, an antioxidant, a neutralizing agent, an inorganic filler, an antiblocking agent, a slipping agent, an antistatic agent, an α-form nucleating agent, a surfactant or the like to be used in an ordinary polyolefin resin can be compounded when necessary.

Specific examples of the antioxidant include a phenol-based antioxidant such as tetrakis[methylene-3-(3',5'-di-t-butyl-4'-hydroxyphenyl)propionate]methane, 2,6-di-t-butyl-4-methylphenol, n-octadecyl-3-(3',5'-di-t-butyl-4'-hydroxyphenyl)propionate and tris(3,5-di-t-butyl-4-hydroxybenzyl)isocyanurate or a phosphorous-based antioxidant such as tris(2,4-di-t-butylphenyl)phosphite, tris(nonylphenyl)phosphite, distearylpentaerythritoldiphosphite and tetrakis(2,4-di-t-butylphenyl)-4,4'-biphenylene-diphosphonite.

Specific examples of the neutralizing agent include higher fatty acid salts such as calcium stearate, specific examples of the inorganic filler and the antiblocking agent include calcium carbonate, silica, hydrotalcite, zeolite, aluminum silicate and magnesium silicate, specific examples of the slipping agent include higher fatty acid amides such as amide stearate, and specific examples of the antistatic agent include fatty acid esters such as glycerol monostearate.

Specific examples of the α-form nucleating agent include a publicly known α-form nucleating agent such as talc, aluminum hydroxy-bis(4-t-butylbenzoate), 1,3:2,4-dibenzylidenesorbitol, 1,3:2,4-bis(p-methylbenzylidene)sorbitol, 1,3:2,4-bis(p-ethylbenzylidene)sorbitol, 1,3:2,4-bis(2',4'-dimethylbenzylidene)sorbitol, 1,3:2,4-bis(3',4'-dimethylbenzylidene)sorbitol, 1,3-p-chlorobenzylidene-2,4-p-methylbenzylidenesorbitol, 1,3:2,4-bis(p-chlorobenzylidene)sorbitol, sodium-bis(4-t-butylphenyl)phosphate, sodium-2,2'-methylene-bis(4,6-di-t-butylphenyl)phosphate, calcium-2,2'-methylene-bis(4,6-di-t-butylphenyl)phosphate and aluminum dihydroxy-2,2'-methylene-bis(4,6-di-t-butylphenyl)phosphate. The nucleating agents may be used alone or in combination of two or more kinds.

As a method for producing the microporous membrane using the polyolefin resin, specific examples of a typified technique include a dry method in which a melted resin is formed into a sheet, and then laminated lamellar structure is formed by heat treatment to form a microporous part by delamination of a crystal interface by uniaxial or biaxial stretching, and a wet method in which a resin and a solvent are heated and melted and formed into a sheet in a state in which microphase separation is kept, and then the solvent is extracted and removed to form a microporous part by uniaxial or biaxial stretching. In the invention, a microporous part produced by a dry uniaxial stretching method is particularly preferably used.

The inorganic filler to be used in the heat-resistant layer of the invention is not particularly limited if the inorganic filler has a melting point of 200° C. or higher and high electric insulation properties and is electrochemically stable. Specific examples include oxide-based ceramics such as alumina, silica, titania, zirconia, magnesia and barium titanate, hydroxide-based ceramics such as aluminum hydroxide and magnesium hydroxide, nitride-based ceramics such as silicon nitride, titanium nitride and boron nitrides, and a substance derived from mineral resources, such as boehmite, talc, kaoline, zeolite, apatite, halloysite, pyrophyllite, montmorillonite, sericite, mica, amesite, bentonite, calcium silicate and magnesium silicate. The materials may be used alone or in combination of two or more kinds. Above all, alumina, silica, titania or boehmite is preferably used. Further, an inorganic filler may be used in which a functional group such as an alkyl group and a phenyl group is introduced onto an inorganic filler surface by using a surface modifier such as a silane coupling agent to hydrophobize the surface.

Specific examples of a method for qualitatively or quantitatively confirming a content of the inorganic filler to be used in the invention include a method for conducting a surface analysis of inorganic particulates in a composite porous film surface layer by a fluorescent X-ray analysis or X-ray photoelectron spectroscopy, and a method for dissolving a thermoplastic resin constituting a composite porous film using a solvent that can dissolve the resin, and separating the inorganic filler contained therein by a technique such as filtration and centrifugation, and then conducting an elemental analysis by a technique such as the surface analysis described above, an atomic absorption method or ICP (high-frequency inductively coupled plasma) atomic emission spectrophotometry. Obviously, the method is not limited to the exemplified methods, and the content can also be confirmed by any other technique. Further, combined use of the techniques is preferred because whether the filler contained therein is one kind or a mixture of a plurality of inorganic fillers can be distinguished by the combined use.

The primary particle size of the inorganic filler is 5 nanometers to 100 nanometers, and preferably, 10 nanometers to 50 nanometers. The primary particle size means a particle size in a minimum unit of the inorganic filler, and the mean particle size described above means a secondary particle size of a cluster formed of an aggregate in which primary particles are aggregated. When the primary particle size is adjusted in the range described above, thermal shrinkage can be minimized even when the temperature significantly exceeds the melting temperature of the microporous membrane, and the adhesion with the microporous membrane can also be significantly improved. As a technique of measuring the primary particle size, for example, the size can be confirmed by measurement of a specific surface area by a gas absorption method, or measurement of the size from an image by a scanning electron microscope (SEM).

Further, the inorganic filler is formed of the cluster formed of the aggregate of a plurality of primary particles, and a mean particle size thereof is preferably 0.3 micrometer or less. The mean particle size is further preferably 0.05 micrometer to 0.3 micrometer, and still further preferably, 0.05 micrometer to 0.1 micrometer. Moreover, when the mean particle size is adjusted in the range described above, clogging of the microporous membrane can be suppressed and air permeability can be maintained, and thus the composite porous film having excellent adhesion with the microporous membrane can be obtained. Specific examples of a technique of measuring the mean particle size include a light scattering method, an image analysis method and a sedimentation method. The mean particle size in the invention is measured using a laser diffraction-scattering type size distribution measuring device, and expressed in terms of a value at a cumulative frequency of 50% in the number of particles.

With regard to a shape of the inorganic filler, various shapes exist, such as a spherical shape, an oval shape, a scale shape, a plate shape, a fibrous shape, a cluster shape and an amorphous shape, but if requirements of the invention are satisfied, such a filler is not particularly limited and can be used. Above all, the spherical shape, the plate shape or the cluster shape is preferred in satisfying both of suppression of the thermal shrinkage and improvement in the adhesion.

The binder is added to the heat-resistant layer and mixed therewith according to the invention for the purpose of improving the adhesion with the inorganic filler and/or the microporous membrane. As a specific example of the binder to be used, a polyolefin resin such as polyethylene, polypropylene and polybutadiene, a fluorine-containing resin such as polyfluorovinylidene, polytetrafluoroethylene, a polyfluorovinylidene-hexafluoropropylene copolymer, a polyfluorovinylidene-hexafluoropropylene-tetrafluoroethylene copolymer and an ethylene-tetrafluoroethylene copolymer, a copolymerized elastomer such as a styrene-butadiene copolymer and a hydrogenated product thereof, an acrylonitrile-butadiene copolymer and a hydrogenated product thereof, an acrylonitrile-butadiene-styrene copolymer and a hydrogenated product thereof, a methacrylic ester-acrylic ester copolymer, a styrene-acrylic ester copolymer, an acrylonitrile-acrylic ester copolymer and an ethylene propylene rubber, a cellulose derivative such as ethylcellulose, hydroxyethylcellulose and carboxymethylcellulose, and a resin such as polyvinyl alcohol, polyamideimide, polyamide, poly-N-vinylacetamide, polyvinylbutyral and polyvinylformal may be used in one kind or in combination of two or more kinds thereof. Moreover, in addition to organic polymers as described above, polyorganosiloxane is mixed with the inorganic filler, and the resulting mixture is coated onto the microporous membrane, and then the resulting material is converted onto $SiO_2$ glass, and thus a space between the inorganic filler and the microporous membrane may be firmly fixed.

A weight fraction of "inorganic filler/binder" in the heat-resistant layer is, although a level depends on specific gravity of a filler material, preferably 40/60 to 98/2, further preferably, 50/50 to 95/5, and still further preferably, 60/40 to 90/10. When the weight fraction is adjusted in the range described above, the composite porous film having a good balance regarding the adhesion with the filler and/or the microporous membrane, and the air permeability of the composite porous film and having excellent heat resistance can be obtained.

A layer thickness of the heat-resistant layer is preferably 0.5 micrometer or more in order to maintain the heat resistance of the composite porous film, and preferably, 20 micrometers or less from a viewpoint of maintaining the air permeability or the adhesion. The thickness is further preferably 1 micrometer to 15 micrometers, and still further preferably, 2 micrometers to 10 micrometers. Moreover, the heat-resistant layer may be laminated so as to become not only one side of the microporous membrane but also both sides of the heat-resistant layer-the microporous membrane-the heat-resistant layer, or an intermediate layer of microporous membrane-heat-resistant layer-microporous membrane. When the heat-resistant layers are laminated on both sides, a layer thickness is expressed in terms of a total of laminated thicknesses, and as the layer thickness of the heat-resistant layer, the heat-resistant layer may be laminated at a thickness identical with or different from the thickness of the heat-resistant layer.

When the balance between the air permeability and the heat resistance is taken into consideration, the microporous membrane to be used in the invention has a film thickness of preferably 5 to 50 micrometers, and further preferably, 10 to 30 micrometers. Moreover, porosity is preferably 30 to 70%, and further preferably, 40 to 60%. With regard to a pore side, as a size in which unevenness of permeability is small and clogging or the like is difficult to occur, a maximum pore size is preferably 35 to 50 nanometers and a mean pore size is preferably 10 to 30 nanometers. Further, in the air permeability, when a balance between ionic permeability and strength is taken into consideration, the air permeability by Gurley Method is preferably 30 to 600 sec/100 mL, and further preferably, 50 to 400 sec/100 mL.

The composite porous film formed of such structure has characteristics of satisfactorily suppressing the thermal shrinkage even when the temperature exceeds the melting temperature of the polyolefin resin to be excellent in the adhesion between the heat-resistant layer and the microporous membrane.

A film thickness of the composite porous film is determined according to an application to be used, such as a filter and a separator, but is preferably 5 micrometers to 150 micrometers. If the film thickness is within the range described above, the thickness is preferred as the composite porous film from viewpoints of the air permeability, the heat resistance, the strength or the like. The thickness is further preferably 6 to 100 micrometers, and still further preferably, 10 to 50 micrometers.

With regard to the air permeability of the composite porous film, when a balance between the strength and the ionic permeability is taken into consideration in a manner identical with the microporous membrane itself, the air permeability by Gurley Method is preferably 30 to 600 sec/100 mL, and further preferably, 50 to 400 sec/100 mL.

In the composite porous film of the invention, the adhesion between the microporous membrane and the heat-resistant layer is good. With regard to the adhesion, a dispersion state between the inorganic filler and the binder in a coating liquid is uniformly adjusted, and thus clogging in the microporous membrane is suppressed, and the adhesion can be improved while the air permeability is maintained, and the dropout of the inorganic filler can be prevented. As a criterion when a panelist rubs a surface of the heat-resistant layer with a finger, if the adhesion is evaluated in three levels of "Good: no dropout is observed even when the surface is strongly rubbed," "Marginal: dropout is observed when the surface is strongly rubbed" and "Bad: dropout is easily observed when the surface is rubbed," although the level depends on the application to be used, if the adhesion is rated to be Marginal or Good, the composite porous film can be satisfactorily used. The adhesion is further preferably rated to be "Good: no dropout is observed even when the surface is strongly rubbed."

Further, the adhesion in the composite porous film in the invention is good with respect to not only the adhesion between the inorganic fillers but also the adhesion between the heat-resistant layer and the microporous membrane. In the former, the adhesion (hereinafter, friction adhesion) can be judged, as described above, by suppression of dropout due to friction on a surface layer of the heat-resistant layer, and in the latter, the adhesion (hereinafter, tape adhesion) can be judged depending on stress during peeling a tape after putting the tape or the like on a side of the heat-resistant layer according to a technique using the tape or the like. To show one example with regard to measurement using a tensile tester, the composite porous film is cut into a strip having a predetermined length, and a pressure-sensitive adhesive double coated tape is put on the heat-resistant layer. Then, a paper cut at a dimension identical the dimension of the composite porous film is put on one side of the pressure-sensitive adhesive tape, ends of the composite porous film and the paper are gripped with chucks, respectively, and thus interfacial peeling strength (gf) of the heat-resistant layer-the microporous membrane can be measured at a constant tensile speed. Conditions thereof are described in Examples. When the tape adhesion is evaluated under the conditions, if the tape adhesion is preferably 500 gf or more, further preferably, 1,000 gf or more, and still further preferably, 2,000 gf or more, the composite porous film can be satisfactorily used.

The composite porous film of the invention has strength at which the thermal shrinkage can be satisfactorily suppressed even when the temperature exceeds the melting temperature of the polyolefin resin, and is excellent in the heat resistance. As evaluation of the heat resistance, the heat resistance can be evaluated using heat resistance at 150° C. and heat resistance at 180° C. based on the thermal shrinkage at 150° C. and 180° C., respectively. If the thermal shrinkage is 19% or less with regard to the heat resistance at 150° C., the composite porous film has strength at which the thermal shrinkage can be satisfactorily suppressed, and the thermal shrinkage is preferably 0 to 15%, and further preferably, 0 to 10%. If the thermal shrinkage is 10% or less with regard to the heat resistance at 180° C., the thermal shrinkage is satisfactory, preferably, 0 to 8%, and further preferably, 0 to 5%. If any of the thermal shrinkage at both temperatures can be minimized, the thermal shrinkage can be satisfactorily suppressed, but the thermal shrinkage at 180° C. being a higher temperature is preferably smaller, and further, the thermal shrinkage at both temperatures are further preferably smaller.

Next, a method for producing the composite porous film of the invention will be described. As the microporous membrane, the microporous membrane produced by the method described above is used, the heat-resistant layer is laminated on one side or both sides of the microporous membrane, or the heat-resistant layer is laminated so as to be the intermediate layer of the two microporous membranes, and thus the composite porous film can be obtained. Specific examples of a method for laminating the heat-resistant layer and the microporous membrane include a method of separately producing the heat-resistant layer and the microporous membrane to laminate both, respectively, and a method of coating the coating liquid containing at least two kinds including the inorganic filler and the binder onto at least one side of the microporous membrane to form the heat-resistant layer. When a thin heat-resistant layer is desirably formed, the latter method is preferred from an aspect of productivity.

The heat-resistant layer is prepared by coating a coating liquid onto at least one side of the microporous membrane, wherein the coating liquid contains at least two ingredients such as the inorganic filler and the binder. Specifically, an embodiment of the method for preparing the heat-resistant layer is described as follows.

(1) The coating liquid is prepared by dispersing 100 parts by weight of inorganic filler into water or a polar organic solvent to prepare a slurry; then mixing a solution of water or a polar organic solvent containing 2 to 150 parts by weight of binder into the prepared slurry. Alternatively, the coating liquid is prepared by stirring the solution of water or the polar organic solvent containing 2 to 150 parts by weight of binder, during the stirring step 100 parts by weight of inorganic filler is directly added into the solution; and then mixing and dispersing the solution and the inorganic filler.

(2) The heat-resistant layer is prepared by coating the coating liquid onto at least one side of a microporous membrane to form a coated film; and then the subjecting the resulting coated film to hot air drying or immersing the resulting coated film into a poor solvent wherein the binder is not dissolved to precipitate the binder.

(1) Preparation of Coating Liquid

At least one kind of various binders previously listed is dissolved into a solvent to make a binder solution. Specific examples of the solvent include water or a polar organic solvent such as acetone, N-methylpyrrolidone, dimethylacetamide, dimethylformamide and dimethylsulfoxide. Moreover, a solvent to be as a poor solvent to the binder can also be added. Microphase-separated structure is induced with addition of such a poor solvent, and thus the heat-resistant layer in which a void part is formed can be formed. When an inorganic filler the primary particle size of which is significantly fine is used particularly as in the invention, the void part in the heat-resistant layer is formed of a matrix formed of the inorganic filler and the binder, and therefore use of such an inorganic filler results in improvement in not only the heat resistance but also the air permeability and solution retention of an electrolytic solution or the like, and thus such use is preferred. As the poor solvent, alcohols are preferred, and polyhydric alcohol such as glycol is particularly preferred. Further, in the case of a solution mainly containing the polar organic solvent, water may be added as the poor solvent. A required amount of inorganic filler is dispersed into the binder solution to prepare the coating liquid. A technique of addition is not particularly limited, and the inorganic filler may be separately dispersed into a solvent identical with the solvent in the binder solution, and then mixed with the binder solution to prepare the coating liquid.

In order to improve dispersibility of the inorganic filler, a dispersant such as ammonium polyacrylate, an antibacterial agent such as benzalkonium chloride and cetyl pyridinium chloride, an antifungal agent or the like may be added within the range in which advantageous effects of the invention are not adversely affected. Moreover, a technique of applying surface treatment to the inorganic filler with the silane coupling agent or the like can also be applied.

Upon dispersing the inorganic filler thereinto, the inorganic filler can be dispersed thereinto by stirring the dispersion using a stirrer such as Disper to prepare the coating liquid, but a device that allows crushing and dispersion with high stress, such as a homogenizer, a beads mill and a jet mill is used, and thus a further uniform coating liquid can be prepared. In particular, the inorganic filler the primary particle size of which is significantly fine originally has high surface energy, and therefore lump-shaped particles are easily formed by aggregation, and remaining fine primary particles easily cause clogging in the microporous membrane, and therefore such a filler is less preferred. However, the lump-shaped particles are crushed by applying secondary dispersion treatment using the device that allows crushing and dispersion, and a plurality of primary particles form the cluster in a uniform size. Further, the binder and the cluster are uniformly dispersed into the coating liquid, and thus a void between the clusters can be maintained, and the composite porous film having the heat-resistant layer in which the fillers are closely packed can be obtained. More specifically, according to the composite porous film of the invention, the inorganic filler the primary particle size of which is significantly fine dispersed into the binder in a moderate and uniform size to synergistically act with other structure with each other and to exhibit an excellent effect of simultaneously having high adhesion with the microporous membrane and also maintaining high air permeability while an effect of a decrease in the thermal shrinkage and improvement in the heat resistance is received by close packing of fine primary particles, which effect is unexpected from an operation effect of original addition of the fine primary particles.

Further, a molecular chain constituting the binder is cut by strong physical stress in a process of the secondary dispersion treatment, and thus uniform dispersion with the inorganic filler the primary particle size of which is significantly fine is promoted. The present inventors have diligently continued to conduct study, and as a result, the coating liquid having excellent adhesion between the inorganic filler and the microporous membrane or with the microporous membrane can be obtained by adjusting weight average molecular weight (Mw) of the binder after the secondary dispersion treatment to 300,000 or more and 1,000,000 or less and adjusting a molecular weight distribution (Mw/Mn) to 2.0 or less.

(2) Coating of Coating Liquid

The coating liquid obtained in section (1) is coated onto at least one side of the microporous membrane. When the heat-resistant layers are formed on both sides of the microporous membrane, simultaneously coating the liquid onto the both sides is preferred from a viewpoint of simplifying the steps. Specific examples of a coating method include a knife coater method, a gravure coater method, a micro-gravure coater method, a screen printing method, a Meyer bar method, a die coater method, a reverse roll coater method, an inkjet method, a spray method and a roll coater method. Above all, the gravure coater method or the micro-gravure coater method is preferred from a viewpoint of uniformity, and the die coater method is also preferred in which the coating liquid is not brought into contact with outdoor air and wear by the inorganic filler is small.

With regard to the microporous membrane, for the purpose of promoting uniform penetration of the coating liquid to further improve the adhesion between the heat-resistant layer and the microporous membrane, surface treatment is also preferably applied to the surface of the microporous membrane in a step prior to coating or immediately before coating in order to achieve the object of the invention. A method of the surface treatment is not particularly limited, if porous structure on the surface of the microporous membrane is not significantly adversely affected, and specific examples include corona discharge treatment and also plasma treatment, a mechanical surface roughening method, a solvent treatment method, an acid treatment method and an oxidation method by irradiation with ultraviolet light.

EXAMPLES

The invention will be described in detail by way of Examples and Comparative Examples below, but the invention is not limited to the Examples. In addition, terms and methods for measuring physical properties in Examples and Comparative Examples are as described below.

1. Film thickness: A composite porous film was cut out in a circular form having a diameter of 72 mm, a dial gauge (probe diameter: 5 mm, measuring load: 1.5 N) was used, and thicknesses were measured on arbitrary 15 places in accordance with A-2 method of JIS K 7130 (1992). An average of values on the 15 places was taken as a film thickness.

2. Mean particle size: In measurement of a mean particle size, measurement was carried out using LA-950 being a laser diffraction-scattering type size distribution measuring device, made by HORIBA, Ltd. to calculate a particle size (median size: d50) at a cumulative frequency of 50% in the number of particles.

3. Primary particle size: In measurement of a primary particle size, from an image on a surface or cross-section in a heat-resistant layer by a scanning electron microscope (SEM), 100 pieces of particles were measured by an image analyzer to calculate a mean particle size.

4. Friction adhesion: With regard to confirmation of friction adhesion, a panelist rubbed a surface of a heat-resistant layer with a finger, and then a level was judged based on the following criteria.

Good: no dropout was observed even when the surface was strongly rubbed.

Marginal: dropout was observed when the surface was strongly rubbed.

Bad: dropout was easily observed when the surface was rubbed.

Figure 3:
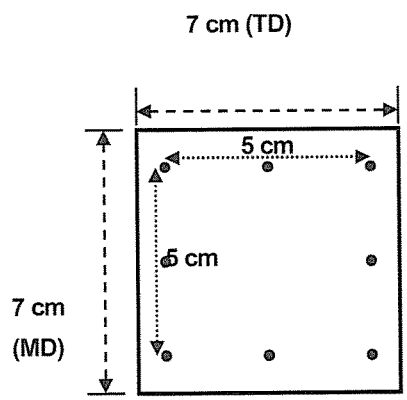
FIG. 3 shows a plot diagram implemented upon measuring of heat resistance at 150° C.

5. Tape adhesion: With regard to confirmation of tape adhesion, stress during peeling a tape was measured using a tensile tester to judge the tape adhesion. A composite porous film was cut into a strip having 2 cm (TD)×7 cm (MD), and a pressure-sensitive adhesive double coated tape (PPS-10: width 1 cm, made by Sumitomo 3M Ltd.) cut into a strip having a length of 2 cm in an identical manner was put on a heat-resistant layer. Then, a kraft paper cut into a strip having width: 2 cm×length: 7 cm was put on one side of the pressure-sensitive adhesive tape, ends of the composite porous film and the paper were gripped with chucks, respectively, and interfacial peeling strength (gf) of the heat-resistant layer-the microporous membrane was measured at a tensile speed of 500 mm/min (see a plot diagram in FIG. 3).

6. Heat resistance: With regard to confirmation of heat resistance, a composite porous film obtained was cut into a square having 7 cm×7 cm, and plots were made in 3 sets for each at an interval of 2.5 cm in a machine direction (MD) and a transverse direction (TD) (see a plot diagram in FIG. 3). The samples were allowed to stand in a constant-temperature bath at 150° C. for 2 hours in a state in which no load was applied, thermal shrinkage was measured from intervals between the plots before and after heating, and a maximum value in either MD or TD was taken as heat resistance at 150° C. Moreover, samples cut into MD 15 mm×TD 3 mm were set within a cell in a state in which a load of 100 mN was applied at a constant level using TMA (thermomechanical analysis: TMA/SS7100E, made by SII NanoTechnology Inc.), and heated to 200° C. from an ordinary temperature at a rate of 5° C./min to measure thermal shrinkage at 180° C. (heat resistance at 180° C.).

7. Air permeability: Air permeability of a composite porous film was measured using Gurley Densometer (air permeance tester) made by Toyo Seiki Seisaku-Sho, Ltd. based on JIS P 8117.

8. Molecular weight: Measurement of molecular weight of a binder was carried out using a gel permeation chromatography (GPC) apparatus. A molecular weight distribution (Mw/Mn) was calculated from number-average molecular weight (Mn) and weight-average molecular weight (Mw) determined by GPC measurement. In the GPC apparatus, PU-2080Plus made by JASCO Corporation was used for a pump and 830-RI made by JASCO Corporation was used for a detector, and as a column, one column (8.0 mm (ID)×300 mm (L)) of Shodex KF-805L+KF-806M kept warm at 35° C. in an oven was used for each, and two columns in total were used. Dimethylformamide (DMF) was used as an eluate, and measurement was carried out under conditions of a flow rate of 1 mL/min.

Example 1

Preparation of Coating Liquid

Into N-methylpyrrolidone (NMP), copolymerized polyvinylidene fluoride (Kynar Flex (registered trademark) 2801: Mw; 579,000, Mw/Mn; 2.28 as measured by GPC, made by Arkema K.K.) was dissolved as a binder to prepare an NMP solution having a weight concentration of 4%. Boehmite (Boehmite C01: primary particle size 30 nm, made by Taimei Chemicals Co., Ltd.) was added thereto to be 8% in a weight concentration and mixed therewith to prepare NMP slurry having a filler/binder weight ratio of 2:1, and the resulting slurry was further stirred using Disper at a rotational speed of 300 rpm for 1 hour. A mean particle size in the resulting slurry was 11 μm in d50. The slurry was further treated 5 times at a treatment pressure of 200 Mpa using a jet mill to prepare 1,000 g of coating liquid having an inorganic filler concentration of 8% by weight and a binder concentration of 4% by weight. A mean particle size of Boehmite in the resulting coating liquid was 0.08 μm in d50. Moreover, when a molecular weight of the binder treated using GPC under identical conditions, Mw was about 320,000 and Mw/Mn was 1.46.

(Coating onto Microporous Membrane)

As a polyolefin microporous membrane, JNC-Cell (registered trademark, thickness: 20 μm, maximum pore size≤30 nm, porosity: 48% and air permeability: 250 sec/100 mL) being a PP separator made by JNC Corporation was used. JNC-Cell was irradiated with $N_2$ plasma as pretreatment, and the coating liquid was coated thereon using a microgravure, and the resulting coated material was dried using a drier to obtain a composite porous film. A film thickness of the composite porous film obtained was 24 μm and air permeability was 260 sec/100 mL. Friction adhesion was "Good": no dropout was observed even when the surface was strongly rubbed, tape adhesion was 3,500 gf, heat resistance at 150° C. was 8%, and heat resistance at 180° C. was 3%. The results are collectively shown in Table 1.

Example 2

A coating liquid was prepared and coated onto a microporous membrane to prepare a composite porous film in a technique similar to the technique in Example 1 except that SiO$_2$ (AEROSIL (registered trademark) MOX80: primary particle size 50 nm, made by Nippon Aerosil Co., Ltd.) was used as an inorganic filler, and the resulting slurry was further treated 3 times at a treatment pressure of 200 Mpa using a jet mill. No measurement of a mean particle size was allowed under the present conditions using a laser diffraction-scattering type size distribution measuring device, and therefore only measurement of a primary particle size by SEM observation was carried out. Values of physical properties of the composite porous film obtained are shown in Table 1.

Example 3

A coating liquid was prepared to adjust a mean particle size of Al$_2$O$_3$ particles in the coating liquid to 0.07 μm, and coated onto a microporous membrane to prepare a composite porous film in a technique similar to the technique in Example 1 except that Al$_2$O$_3$ (AEROXIDE (registered trademark) AluC: primary particle size 15 nm, made by Nippon Aerosil Co., Ltd.) was used as an inorganic filler, and the resulting slurry was further treated once at a treatment pressure of 200 Mpa using a jet mill. Values of physical properties of the composite porous film obtained are shown in Table 1.

Example 4

Into N-methylpyrrolidone (NMP), polyvinylidene fluoride (Kynar HSV500: Mw; 885,000, Mw/Mn; 2.47 by GPC measurement, made by Arkema K.K.) was dissolved as a binder to prepare an NMP solution having a weight concentration of 3%. Al$_2$O$_3$ (AEROXIDE (registered trademark) AluC: primary particle size 15 nm, made by Nippon Aerosil Co., Ltd.) was added thereto to be 9% in a weight concentration, and mixed therewith to prepare NMP slurry having a filler/binder weight ratio of 3:1, and the resulting slurry was further stirred at a rotational speed of 300 rpm for 1 hour using Disper. A mean particle size in the slurry obtained was 11 μm in d50. The resulting slurry was further treated once at a treatment pressure of 200 Mpa using a jet mill to prepare 1,000 g of coating liquid having an inorganic filler concentration of 9% by weight and a binder concentration of 3% by weight. A mean particle size of Al$_2$O$_3$ in the resulting coating liquid was 0.11 μm in d50. Then, as a polyolefin microporous membrane, JNC-Cell (registered trademark, film thickness: 15 μm, maximum pore size≤30 nm, porosity: 52% and air permeability: 170 sec/100 mL) was used, and a composite porous film was prepared in a technique similar to the technique in Example 1. Values of physical properties of the composite porous film obtained are shown in Table 1.

Example 5

Into N-methylpyrrolidone (NMP), polyvinylidene fluoride (Kynar HSV900; Mw; 1,091,000, Mw/Mn; 2.02 by GPC measurement, made by Arkema K.K.) was dissolved as a binder to prepare an NMP solution having a weight concentration of 2.4%. Boehmite (Boehmite C06: primary particle size 100 nm, made by Taimei Chemicals Co., Ltd.) was added thereto to be 9.6% in a weight concentration, and mixed therewith to prepare NMP slurry having a filler/binder weight ratio of 4:1, and the resulting slurry was further stirred at a rotational speed of 300 rpm for 1 hour using Disper. A mean particle size in the slurry obtained was 15.5 μm in d50. The slurry was further treated 3 times at a treatment pressure of 200 Mpa using a jet mill to prepare 1,000 g of coating liquid having an inorganic filler concentration of 9.6% by weight and a binder concentration of 2.4% by weight. A mean particle size of boehmite in the resulting coating liquid was 0.30 μm in d50. Then, as a polyolefin microporous membrane, JNC-Cell (registered trademark, film thickness: 15 μm, maximum pore size 30 nm, porosity: 47% and air permeability: 220 sec/100 mL) was used to prepare a composite porous film in a technique similar to the technique in Example 1. Values of physical properties of the composite porous film obtained are shown in Table 2.

Example 6

Into N-methylpyrrolidone (NMP), copolymerized polyvinylidene fluoride (Kynar 2801, made by Arkema K.K.) was dissolved as a binder to prepare an NMP solution having a weight concentration of 4%. As Al$_2$O$_3$ having a different particle size, AEROXIDE AluC (primary particle size: 15 nm) was added to be 4% in a weight concentration, and SG-ALO100UP (primary particle size: 110 nm) was added thereto to be 4% in a weight concentration, and mixed therewith to prepare NMP slurry having a filler/binder weight ratio of 2:1. The resulting slurry was further stirred at a rotational speed of 300 rpm for 1 hour using Disper, and then treated once at a treatment pressure of 170 Mpa using a jet mill to prepare 1,000 g of coating liquid having an inorganic filler concentration of 8% by weight and a binder concentration of 4% by weight. Then, as a polyolefin microporous membrane, JNC-Cell (registered trademark, film thickness: 21 μm, maximum pore size 30 nm, porosity: 53% and air permeability: 150 sec/100 mL) was used to prepare a composite porous film in a technique similar to the technique in Example 1. Values of physical properties of the composite porous film obtained are shown in Table 2.

Example 7

A composite porous film was prepared in a technique similar to the technique in Example 1 except that JNC-Cell (registered trademark, film thickness: 15 μm, maximum pore size≤30 nm, porosity: 49% and air permeability: 180 sec/100 mL) being a PP separator made by JNC Corporation was used as a polyolefin microporous membrane. Values of physical properties of the composite porous film obtained are shown in Table 2.

Example 8

A composite porous film was prepared in a technique similar to the technique in Example 1 except that boehmite (DISPAL (registered trademark) 10C: primary particle size 50 nm, made by Sasol Limited) was used as an inorganic filler, and the resulting slurry was treated once at 200 Mpa using a jet mill to prepare a coating liquid to adjust a mean particle size of boehmite in the coating liquid to 0.3 μm. Values of physical properties of the composite porous film obtained are shown in Table 2. Adhesion is slightly lower in comparison with Example 1, and dropout was observed by strong rubbing with a finger. Heat resistance at 180° C. was sufficient, but heat resistance at 150° C. was slightly low.

Example 9

A composite porous film was prepared in a technique similar to the technique in Example 1 except that NMP slurry was prepared in a step identical with the step in Example 1, and then a coating liquid was prepared by stirring (8,000 rpm, 1 hour) using Disper only, to adjust a mean particle size of boehmite in the coating liquid to 10 μm. Values of physical properties of the composite porous film obtained are shown in Table 2. Adhesion of the composite porous film obtained was slightly lower in comparison with Example 1, and dropout was observed by strong rubbing with a finger. Heat resistance at 180° C. was sufficient, but heat resistance at 150° C. was slightly low.

Comparative Example 1

Heat resistance was evaluated without a heat-resistant layer coat for a microporous membrane used in Example 1. Shrinkage at 150° C. for 2 hours (heat resistance at 150° C.) was 33%, and shrinkage under conditions placed in an atmosphere at 180° C. (heat resistance at 180° C.) was 25%. Values of physical properties of the composite porous film obtained are shown in Table 3.

Comparative Example 2

A coating liquid was prepared to adjust a mean particle size of $Al_2O_3$ particles in the coating liquid to 0.3 μm, and coated onto a microporous membrane to prepare a composite porous film in a manner similar to Example 1 except that $Al_2O_3$ particles (CERALOX (registered trademark) APA-0.5, made by Sasol Limited) having a primary particle size of 250 nm were used, and the resulting slurry was stirred (8,000 rpm, 1 hour) using Disper only. Values of physical properties the composite porous film obtained are shown in Table 3. Shrinkage at 150° C. for 2 hours (heat resistance at 150° C.) was 21%, exceeding 20%, and shrinkage under conditions placed in an atmosphere at 180° C. (heat resistance at 180° C.) was 10%.

Comparative Example 3

A coating liquid was prepared to adjust a mean particle size of $Al_2O_3$ particles in the coating liquid to 0.26 μm, and coated onto a microporous membrane to prepare a composite porous film in a technique similar to the technique in Comparative Example 2 except that the resultant slurry was treated once at a treatment pressure of 200 Mpa using a jet mill. Values of physical properties of the composite porous film obtained are shown in Table 3. Shrinkage at 150° C. for 2 hours (heat resistance at 150° C.) was 20%, and shrinkage under conditions placed in an atmosphere at 180° C. (heat resistance at 180° C.) was 10%.

Comparative Example 4

A coating liquid was prepared, and coated onto a microporous membrane to prepare a composite porous film in a manner similar to Example 1 except that the resultant slurry of $Al_2O_3$ particles having a primary particle size of 650 nm was once treated at treatment pressure of 200 Mpa using a jet mill. Values of physical properties of the composite porous film obtained are shown in Table 3. Adhesion of the microporous membrane obtained was low, and dropout was easily observed when the surface was rubbed with a finger, and therefore heat resistance at 150° C. and heat resistance at 180° C. were not measured.

TABLE 1

| | Item | | Example 1 | Example 2 | Example 3 | Example 4 |
|---|---|---|---|---|---|---|
| Coating liquid | Solvent | | NMP | NMP | NMP | NMP |
| | Inorganic filler | | Boehmite | $SiO_2$ | $Al_2O_3$ | $Al_2O_3$ |
| | Mean particle size | μm | 0.08 | — | 0.07 | 0.11 |
| | Primary particle size | nm | 30 | 50 | 15 | 15 |
| | Binder | | co-PVDF | co-PVDF | co-PVDF | PVDF |
| | Secondary dispersion conditions | | 200 Mpa 5 times | 200 Mpa 3 times | 200 Mpa Once | 200 Mpa Once |
| Microporous membrane | Film thickness | μm | 20 | 20 | 20 | 15 |
| | Porosity | % | 48 | 48 | 48 | 52 |
| | Maximum pore size | nm | ≤30 | ≤30 | ≤30 | ≤30 |
| | Air permeability | sec/100 mL | 250 | 250 | 250 | 170 |
| Composite porous film | Film thickness | μm | 24 | 25 | 24 | 19 |
| | Air permeability | sec/100 mL | 260 | 250 | 260 | 170 |
| | Friction adhesion | | Good | Good | Good | Good |
| | Tape adhesion gf | | 3,500 | 1,500 | 1,800 | 3,100 |
| | Heat resistance at 150° C. | % | 8 | 9 | 9 | 9 |
| | Heat resistance at 180° C. | % | 3 | 2 | 4 | 4 |

TABLE 2

| | Item | | Example 5 | Example 6 | Example 7 | Example 8 | Example 9 |
|---|---|---|---|---|---|---|---|
| Coating liquid | Solvent | | NMP | NMP | NMP | NMP | NMP |
| | Inorganic filler | | Boehmite | $Al_2O_3$ | Boehmite | Boehmite | Boehmite |
| | Mean particle size | μm | 0.3 | — | 0.08 | 0.3 | 10 |
| | Primary particle size | nm | 100 | 15 + 110 | 30 | 50 | 30 |
| | Binder | | PVDF | co-PVDF | co-PVDF | co-PVDF | co-PVDF |
| | Secondary dispersion conditions | | 200 Mpa 3 times | 170 Mpa Once | 200 Mpa 5 times | 200 Mpa Once | Disper only |

TABLE 2-continued

| Item | | | Example 5 | Example 6 | Example 7 | Example 8 | Example 9 |
|---|---|---|---|---|---|---|---|
| Microporous membrane | Film thickness | μm | 15 | 21 | 15 | 20 | 20 |
| | Porosity | % | 47 | 53 | 49 | 48 | 48 |
| | Maximum pore size | nm | ≤30 | ≤30 | ≤30 | ≤30 | ≤30 |
| | Air permeability | sec/100 mL | 220 | 150 | 180 | 250 | 250 |
| Composite porous film | Film thickness | μm | 19 | 24 | 19 | 25 | 25 |
| | Air permeability | sec/100 mL | 220 | 150 | 240 | 300 | 250 |
| | Friction adhesion | | Marginal | Good | Good | Marginal | Marginal |
| | Tape adhesion gf | | 1,600 | 1,600 | 4,000 | 1,000 | 1,200 |
| | Heat resistance at 150° C. | % | 10 | 9 | 6 | 17 | 18 |
| | Heat resistance at 180° C. | % | 4 | 4 | 2 | 8 | 8 |

TABLE 3

| Item | | | Comparative Example 1 | Comparative Example 2 | Comparative Example 3 | Comparative Example 4 |
|---|---|---|---|---|---|---|
| Coating liquid | Solvent | | — | NMP | NMP | NMP |
| | Inorganic filler | | — | $Al_2O_3$ | $Al_2O_3$ | $Al_2O_3$ |
| | Mean particle size | μm | — | 0.3 | 0.26 | Not measured |
| | Primary particle size | nm | — | 250 | 250 | 650 |
| | Binder | | — | co-PVDF | co-PVDF | co-PVDF |
| | Secondary dispersion conditions | | — | Disper only | 200 Mpa Once | 200 Mpa Once |
| Microporous membrane | Film thickness | μm | 20 | 20 | 20 | 20 |
| | Porosity | % | 48 | 48 | 48 | 48 |
| | Maximum pore size | nm | ≤30 | ≤30 | ≤30 | ≤30 |
| | Air permeability | sec/100 mL | 250 | 250 | 250 | 250 |
| Composite porous film | Film thickness | μm | 20 | 22 | 22 | 22 |
| | Air permeability | sec/100 mL | 250 | 250 | 250 | 260 |
| | Friction adhesion | | — | Marginal | Marginal | Bad |
| | Tape adhesion gf | | — | 200 | 250 | 100 |
| | Heat resistance at 150° C. | % | 33 | 21 | 20 | Not measured |
| | Heat resistance at 180° C. | % | 25 | 10 | 10 | Not measured |

The results show that, according to the composite porous film of the invention, thermal shrinkage can be satisfactorily suppressed even under conditions in which temperature rises to the melting temperature or higher, and the adhesion between the microporous membrane and the heat-resistant layer can be improved, and dropout of the inorganic filler can also be suppressed. Moreover, the dropout of the inorganic filler can be suppressed and therefore the composite porous film can also contribute to improvement in productivity. The composite porous film has satisfactory heat resistance, and therefore when the film is applied particularly in the form of the separator, prevention of the short circuit between the electrodes can be maintained.

INDUSTRIAL APPLICABILITY

A composite porous film of the invention can be used as a porous film to be used for a filter, a separator and so forth to be used under high temperature conditions.

What is claimed is:

1. A composite porous film comprising a heat-resistant layer formed of an inorganic filler and a binder, and a microporous membrane formed of a polyolefin resin, wherein the heat-resistant layer is laminated on the microporous membrane, a primary particle size of the inorganic filler is 5 nanometers to 100 nanometers, a weight average molecular weight (Mw) of the binder is 300,000 to 1,000,000, a molecular weight distribution (Mw/Mn) of the binder is 2.0 or less, and the microporous membrane has a film thickness of 10-30 micrometers and a porosity of 40 to 60%.

2. The composite porous film according to claim 1, wherein the inorganic filler constituting the heat-resistant layer is at least one kind selected from the group consisting of alumina, boehmite, silica and titania.

3. The composite porous film according to claim 1, wherein the inorganic filler constituting the heat-resistant layer comprises an aggregate of a plurality of primary particles, and a mean particle size of the aggregate is 0.3 micrometer or less.

4. The composite porous film according to claim 1, wherein the microporous membrane constituting the composite porous film is prepared by a dry uniaxial stretching method.

5. The composite porous film according to claim 1, wherein the polyolefin resin constituting the microporous membrane is polypropylene.

* * * * *